(12) United States Patent
Popelek et al.

(10) Patent No.: US 6,363,186 B1
(45) Date of Patent: Mar. 26, 2002

(54) X-CUBE INTEGRATED SOLID OPTICS COMPONENT

(75) Inventors: Jan Popelek, Princeton; Yao Li, Monmouth Junction, both of NJ (US)

(73) Assignee: NEC Research Institute, Inc., Princeton, NJ (US)

( * ) Notice: Subject to any disclaimer, the term of this patent is extended or adjusted under 35 U.S.C. 154(b) by 0 days.

(21) Appl. No.: 09/515,027

(22) Filed: Feb. 29, 2000

(51) Int. Cl.$^7$ .................................................. G02B 6/34
(52) U.S. Cl. ............................. 385/36; 385/25; 385/18; 359/129
(58) Field of Search ............................. 385/36, 24, 14, 385/18; 359/129

(56) References Cited

U.S. PATENT DOCUMENTS

| | | | | |
|---|---|---|---|---|
| 6,018,418 A | * | 1/2000 | Pan | 359/495 |
| 6,019,474 A | * | 2/2000 | Doany | 353/33 |
| 6,097,544 A | * | 8/2000 | Edinger | 359/634 |
| 6,275,312 B1 | * | 8/2001 | Derks | 359/117 |

FOREIGN PATENT DOCUMENTS

JP 05-27136 * 5/1993

OTHER PUBLICATIONS

M.P. Schamschula et al., "Space filling modular optics", Optics Letters, 19 (1994) 689–691.
M.P. Schamschula et al., "Regular geometries for folded optical module, " Applied Optics 34 (1995) 816–827.
J. Jahns, "Planar packaging of free–space optical interconnections," Proc. IEEE, 82 (1994) 1623–1631.
H Nakano et al., 10–Gb/s, 4–channel WDM fiber transmission using semiconductor optical amplifier modules, IEEE J. Lightwave Tech., 11 (1993) 612–618.
Y. Tachikawa et al., "Lightwave transrouter based on array–waveguide grating multiplexer, " Electronic Letter, 30(1994) 1504–1506.
K.–P. Ho et al., "Eight–channel bi–directional WDM add/drop multiplexer, " Electronic Letter, 34 (1998) 947–948.

* cited by examiner

Primary Examiner—Darren Schuberg
Assistant Examiner—Leo Boutsikaris
(74) Attorney, Agent, or Firm—Scully, Scott Murphy & Presser

(57) ABSTRACT

An X-cube integrated solid-optics component which can perform beam-splitting and filtering functions among four input beams. The X-cube component can also be used for various wavelength-division multiplexing communication and interconnection applications, such as star-coupling, wavelength routing, and add/drop multiplexing. The X-cube component comprises an assembly of four right-angle rooftop prisms positioned with the apex of each roof-top prism at the center of the assembly, such that assembly defines two mutually orthogonal and intersecting internal planes which intersect at the center of assembly to form four sections of the intersecting internal planes. The four plane sections form up to four or more primary optical channel paths having up to four or more potential inputs $I_{AI}$, $I_{BI}$, $I_{CI}$, $I_{DI}$ and four or more potential outputs $I_{AO}$, $I_{BO}$, $I_{CO}$, and $I_{DO}$, and the outputs depend upon functionalities provided by the four sections of the intersecting internal planes.

11 Claims, 3 Drawing Sheets

X-CUBE INTEGRATED SOLID OPTICS COMPONENT

BACKGROUND OF THE INVENTION

Field of the Invention

The present invention relates generally to an X-cube integrated solid optics component, and more particularly pertains to an X-cube integrated solid optics component which comprises an assembly of four right-angle roof-top prisms positioned with the apex of each roof-top prism at the center of the assembly. The assembly defines two mutually orthogonal and intersecting internal planes which intersect at the center of assembly to form four sections of the intersecting internal planes. The four plane sections form up to four or more primary optical channel paths having up to four or more potential inputs $I_{AI}$, $I_{BI}$, $I_{CI}$, $I_{DI}$ and four or more potential outputs $I_{AO}$, $I_{BO}$, $I_{CO}$, and $I_{DO}$, and the outputs depend upon functionalities provided by the four sections of the intersecting internal planes.

Concepts of space-filling solid optics have been introduced in the past few years to address packaging concerns of opto-electronic systems [M. P. Schamschula, H. J. Caulfield, and A. Brown, "Space filling modular optics," Opt. Lett., 19 (1994) 689–691; M. P. Schamschula, P. Reardon, H. J. Caulfield, C. F. Hester, "Regular geometries for folded optical modules," Appl. Opt. 34 (1995) 816–827; J. Jahns, "Planar packaging of free-space optical interconnection," Proc. IEEE, 82 (1994) 1623–1631]. Instead of having to use separate mountings for various discrete optical components, solid optics modules integrate these components together to form a single compact unit.

The present invention concerns a new type of solid optics module, an X-cube, for effective beam splitting and optical filtering. Such beam splitting and filtering functions are becoming integral parts of future local optical interconnections using wavelength-division multiplexing (WDM) techniques. In fact, as technology migrates from 1 Gb/s Ethernet to 10-Gb/s Ethernet environments in the near future, methods for handling 4×2.5 Gb/s WDM channels are actively being researched [H. Nakano, S. Tsuji, S. Sasaki, K. Uomi, and K. Yamashita, "10-Gb/s, 4-channel WDM fiber transmission using semiconductor optical amplifier modules", IEEE J. Lightwave Tech., 11 (1993) 612–618]. Four-channel fiber-based optically functional components and devices will become an active research and development area.

SUMMARY OF THE INVENTION

Accordingly, it is a primary object of the present invention to provide an X-cube integrated solid optics component for optical beam splitting and/or optical filtering. The X-cube component comprises an assembly of four right-angle roof-top prisms positioned with the apex of each roof-top prism at the center of the assembly, such that the assembly defines two mutually orthogonal and intersecting internal planes which intersect at the center of assembly, to form four sections of the intersecting internal planes. The four plane sections form up to four or more primary optical channel paths having up to four or more potential inputs $I_{AI}$, $I_{BI}$, $I_{CI}$, and $I_{DI}$ and four or more potential outputs $I_{AO}$, $I_{BO}$, $I_{CO}$ and $I_{DO}$, and the outputs depend upon functionalities provided by the four sections of the intersecting internal planes.

Denoting intensity transmission coefficients which can be functionally static or dynamic with respect to time, of the four sections of the intersecting internal planes as $t_a$, $t_b$, $t_c$, and $t_d$ and assuming ideal lossless conditions at the intersecting internal planes, the integrated solid optical module defines the following set of input-output relations, $$I_{AO}=I_{AI}(1-t_a)(1-t_d)+I_{BI}t_a(1-t_d)+I_{CI}t_ct_d+I_{DI}(1-t_c)t_d$$

$$I_{BO}=I_{AI}t_a(1-t_b)+I_{BI}(1-t_a)(1-t_b)+I_{CI}(1-t_c)t_b+I_{DI}t_ct_b$$

$$I_{CO}=I_{AI}t_at_b+I_{BI}(1-t_a)t_b+I_{CI}(1-t_c)(1-t_b)+I_{DI}t_c(1-t_b)$$

$$I_{DO}=I_{AI}(1-t_a)t_d+I_{BI}t_at_d+I_{CI}t_c(1-t_d)+I_{DI}(1-t_c)(1-t_d)$$

Depending upon the transmission coefficients, the X-cube component and the four outputs are used for different applications.

BRIEF DESCRIPTION OF THE DRAWINGS

The foregoing objects and advantages of the present invention for an X-cube integrated solid optics component may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
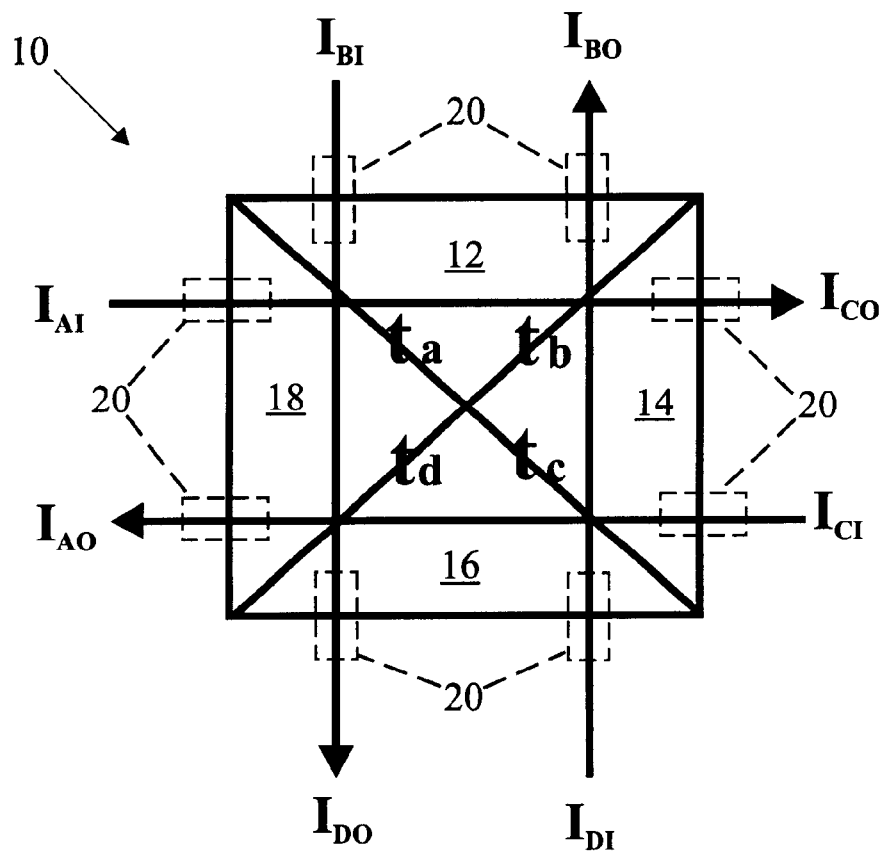
FIG. 1 is a schematic illustration of a top view of an optical X-cube wherein $t_a$, and $t_b$, $t_c$, $t_d$ are intensity transmission coefficients for four prism internal interfaces.

Referring to the drawings in detail, FIG. 1 is a schematic illustration of an X-cube 10 and a possible function thereof. The X-cube 10 is formed by assembling together a set of four substantially identical right-angle roof-top prisms 12, 14, 16 and 18. The assembled optical cube has two mutually orthogonal and intersecting internal planes which form an X, and thus the cube is termed an X-cube. However it should be noted initially that although the term X-cube has been chosen because of the X plane configuration shown in FIG. 1, the assembly is not a true cube as the dimension in the z direction (out of the drawing) is not equal to the x and y dimensions.

When the X-cube is used in a way as suggested in FIG. 1, it has four inputs $I_{AI}$, $I_{BI}$, $I_{CI}$, and $I_{DI}$, as well as four outputs $I_{AO}$, $I_{BO}$, $I_{CO}$, and $I_{DO}$, respectively. Exactly what will be generated at the outputs depends upon functionalities provided by the four sections of the X-shaped intersecting planes. Denoting the intensity transmission coefficients of the four sections of these planes as $t_a$, $t_b$, $t_c$, and $t_d$, and assuming ideal lossless conditions at these planes, the X-cube defines a set of input-output relations as $$I_{AO}=I_{AI}(1-t_a)(1-t_d)+I_{BI}t_a(1-t_d)+I_{CI}t_ct_d+I_{DI}(1-t_c)t_d$$

$$I_{BO}=I_{AI}t_a(1-t_b)+I_{BI}(1-t_a)(1-t_b)+I_{CI}(1-t_c)t_b+I_{DI}t_ct_b$$

$$I_{CO}=I_{AI}t_a t_b+I_{BI}(1-t_a)t_b+I_{CI}(1-t_c)(1-t_b)+I_{DI}t_c(1-t_b)$$

$$I_{DO}=I_{AI}(1-t_a)t_d+I_{BI}t_a t_d+I_{CI}t_c(1-t_d)+I_{DI}(1-t_c)(1-t_d)$$

Thus, depending upon the choice of transmission coefficients, the four outputs can be used for various applications. Table 1 summarizes three possible applications for the X-cube.

First, in the first line of Table 1, the X-cube functions as a lossless 4×4 beam-splitter or star-coupler by selecting all four transmission coefficients to be 0.5. In this case, each of the four outputs receives a quarter of its optical power from all four inputs. For a wavelength-division multiplexer (WDM) star-coupling application, a broadband coating on each of the four filter sections to cover and pass the four wavelength channels is essential.

The second application, shown in the second through fifth lines in Table 1, is a passive wavelength router where each of the four inputs contains four identical wavelength channels [Y. Tachikawa, and M. Kawachi, "Lightwave transrouter based on array-waveguide grating multiplexer," Electron. Lett., (1994) 1504–1506]. The purpose of a WDM wavelength router is to permute among wavelength-and-space coded channels. As shown in the left column of Table 1, each of the four reflective planes serves to transmit two adjacent wavelength bands while reflecting the other two wavelength bands (in the second line, $t_a$ has transmission coefficient of 1 for $\lambda_1$ and $\lambda_2$ and has a transmission coefficient of 0 for $\lambda_3$ and $\lambda_4$). When the four planes are coated accordingly, each of the four output space channels shuffles their wavelength channels in the way summarized in the middle column in Table 1.

The third possible application presented in the bottom lines of Table 1 is a two channel WDM add/drop multiplexer which can download data transmitted by two wavelength carriers, say $\lambda_i$ and $\lambda_j$ out of n possible WDM channels ($\lambda_1$, $\lambda_i$, ..., $\lambda_j$, ... $\lambda_n$), and at the same time upload new data to the two wavelength carriers [K.-P. Ho and S.-V. Liaw, "Eight-channel bidirectional WDM add/drop multiplexer," Electron. Lett., (1998) 947–948]. In this case, only six out of the eight ports of the X-cube are used, two for the main input and output channels, and two each for the added/dropped wavelength channels for each carrier. The corresponding filter assignments are given in Table 1. In addition to the mentioned applications, other possible embodiments can include applications with polarization-coded beam-splitting and filtering. Moreover other embodiments can employ active filter planes incorporating switching functionalities, whereby additional applications and uses of the 4×4 solid optical component are possible.

Figure 2A:
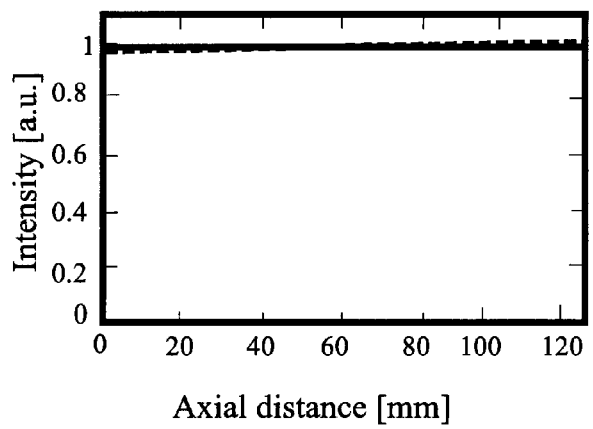
FIG. 2 illustrates respectively axial (lateral (b), and angular (c) alignment sensitivity measurements of a collimating-focusing fiber pair, wherein (b) and (c) are obtained for a d=60 mm gap distance.
Figure 2B:
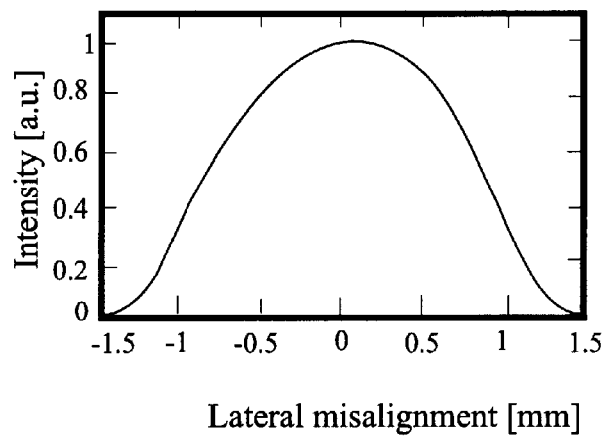
Figure 2C:
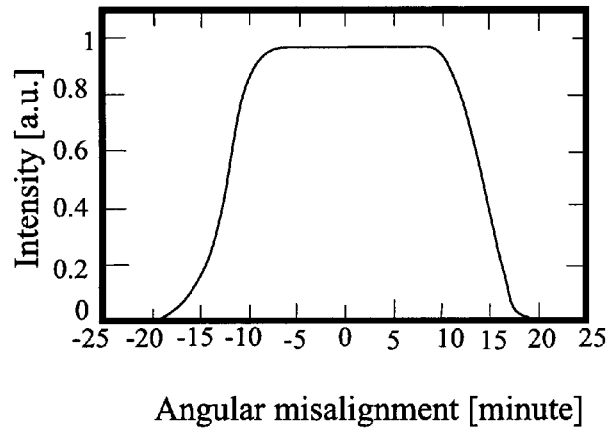

To facilitate the usage of the X-cube, precision fabrication and integration of individual components must be executed. In one embodiment, to fabricate a fiber-interfaced 4×4 star-coupler, a set of four high precision right-angle roof-top prisms of 35 mm base length was selected to have a 6 second angular tolerance for the 90° angle, and a 15 second tolerance for the two other angles. The surface flatness of all three optical planes of the prism was controlled to be within one optical fringe defined by using interferometric methods. These prisms were then coated with multilayer dielectric coatings designed for 50/50 splitting ratio for the λ=1300 nm for one of their two roof-planes, with anti-reflection coatings for their base-plane. The other roof-plane was not coated in order for the cemented X-cube to be 50% reflective at all four of its internal planes. The cementing process did not use any active alignment method. The four individual prisms were cemented in two steps, first to form two 2-prism pairs and second to cement the two composite units together. The first step was executed when the two prisms were placed on a piece of flat glass with a second reference perpendicular glass plate placed as a reference adjacent to the combined prism's vertical plane. The second and final step was performed with only one reference plane, the bottom glass plate. The fabricated X-cube was intended for a fiber-optics interface. To facilitate the opto-mechanical packaging, eight interfacing multimode fiber collimators were acquired and tested. These collimators were capable of being configured as collimating-focusing pairs. The insertion loss for such a pair was designed to be 0.8 dB. Four such collimating-focusing pairs were tested for their actual insertion losses vs. the free-space gap distance between the collimator and focuser. FIG. 2($a$), shows the test scan results indicating a reasonable uniformity around 0.87 dB for a gap distance as large as 120 mm. When the gap distance was fixed at 60 mm (the designed gap distance when considering the prism media's refractive index), each pair was also tested for its lateral misalignment tolerance (see FIG. 2($b$) for a typical scan) and angular misalignment tolerance (see FIG. 2($c$) for a typical scan).

An opto-mechanical packaging of the fiber-interfaced X-cube module was designed accordingly. The main housing has a raised floor to place the X-cube, four walls, each having two round holes to insert the fiber collimators, illustrated schematically in phantom at 20 in FIG. 1. The top cap of the housing contains four adjusting screws for minor two dimensional (2D) tilt adjustment of the already placed X-cube. Each of the eight fiber-collimators was fixed into a triangularly shaped spring-loaded mounting block. Each such block was designed to be two dimensional (2D) angularly adjustable. Because the collimating-focusing pairs have 3 dB lateral displacement tolerance in the order of hundreds of microns, the entire opto-mechanical mounting did not incorporate separate displacement adjustment capability, as the precision of parts fabrication and X-cube placement should be well within the allowed tolerance range. To analyze the overall tolerances of the entire packaging, the emphasis was on angular tolerance induced errors. The sources of such errors come from both the X-cube's angular errors $\theta_{ip}$ and $\theta_{op}$ (each beam can be reflected twice at most) and the fiber-collimator's alignment errors $\alpha_{ip}$ and $\alpha_{ip}$ respectively. The subscripts ip and op denote in-plane and out-of-plane components with respect to the plane referred to as the beam propagation plane. The errors can affect outputs in the form of both displacement errors: $\Delta_{ip}$ and $\Delta_{op}$ and angular errors: $\Delta\beta_{ip}$ and $\Delta\beta_{op}$. A summary of the tolerance analysis in a truth table format is shown in Table 2 where d denotes the gap distance between two end surfaces of the fiber collimating-focusing pair. As shown in the last row of the table, the most damaging case happens when all four errors are present.

For the final integration and packaging, four fiber polarization controllers were used before input fibers to filter out polarization-related errors from the power meters. Alignment was started by activating input IA, and aligning all four outputs. Activation of inputs $I_{CI}$, $I_{BI}$, and $I_{DI}$ was in order. Each time, re-adjustment of alignments was needed. It was noticed that inclusions of the first three inputs were relatively easy. The last input was most difficult to deal with. With the inclusion of the polarization controller and X-cube, the average total insertion loss increased by about 1.23 dB to 2.1 dB. The splitting ratios of the packaged X-cube device were measured as follows. To filter out the error caused by the insertion loss, we let the measured splitting ratio S be $$S = \frac{I_{iO}}{I_{AO} + I_{BO} + I_{CO} + I_{DO}}$$

for all four inputs, i.e. $I_{AI}$, $I_{BI}$, $I_{CI}$, and $I_{DI}$, where i=A, B, C, D. Each of the sixteen measured data was then divided by the designed X-cube splitting ratio to yield the uniformity measure U which should be unity in an ideal situation. The average of sixteen data: $U_{AV}$ and its variance au were obtained for two sets of measurements. Before the final alignment, $U_{AV}$=1.002 and $\sigma_U$=0.104. After the final alignment, they became $U_{AV}$=1.036 and $\sigma_U$=0.279, respectively. For both situations, s-polarization state was used for all four inputs. Excluding the surrounding fiber polarization controllers, dimensions of the X-cube opto-mechanical packaging was 70×70×30 mm³.

To summarize, the present invention has demonstrated a new solid-optics component, an X-cube composite prism which has 4×4 input/output channels. The X-cube can be used for beam-splitting, star-coupling, VDM wavelength routing, and add/drop multiplexing, among many other passive and active operations. An X-cube-based and fiber-interfaced opto-mechanical packaging module was designed and implemented, and its performance showed a 2.1 dB insertion loss, a uniformity ratio of 1.036 and a uniformity variance of 0.279.

---

$t_{ai} = t_{bj} = t_{ci} = t_{dj} = 1.0$
all other $t_{a,b,c,d} = 0$ such that,
$I_{AI} = I(\lambda_1 \ldots \lambda_{i\;drop}, \ldots \lambda_{j\;drop}, \ldots \lambda_n)$
$I_{BI} = I(\lambda_{i\;add})$, $I_{DI} = 0$, $I_{DI} = I(\lambda_{j\;add})$
$I_{AO} = I(\lambda_1 \ldots \lambda_{i\;add}, \ldots \lambda_{j\;add}, \ldots \lambda_n)$
$I_{BO} = I(\lambda_{i\;drop})$, $I_{CO} = 0$, $I_{DO} = I(\lambda_{j\;drop})$.

---

Figure 3:
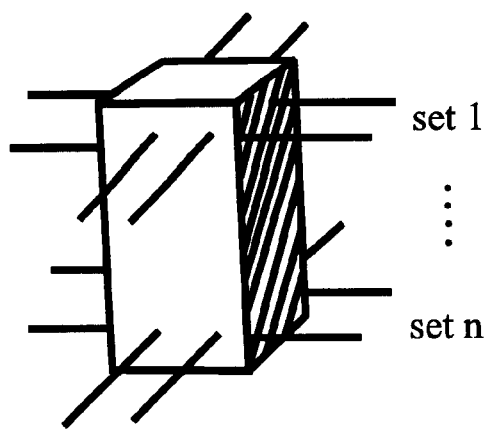
FIG. 3 illustrates an embodiment which adds additional sets (1 to n) optical channel paths beyond the one set of four primary optical channel paths, wherein each additional set of four optical channel paths is positioned at a different fixed and spaced position along the central longitudinal axis of the X-cube.

Moreover, in the embodiment of FIG. 3 the X-shaped intersecting internal planes can be divided into more than four different intensity transmission coefficients, for instance each different fixed and spaced position along the axis could have different intensity transmission coefficients, for instance each different for each different set.

In FIG. 3 the X-cube is shared by different sets of optical inputs and outputs spaced along the vertical dimension. In this way, each physical X-cube block can process many sets of optical inputs and outputs. By incorporating different transmission coefficients, these sets can perform different optical functions.

Figure 4:
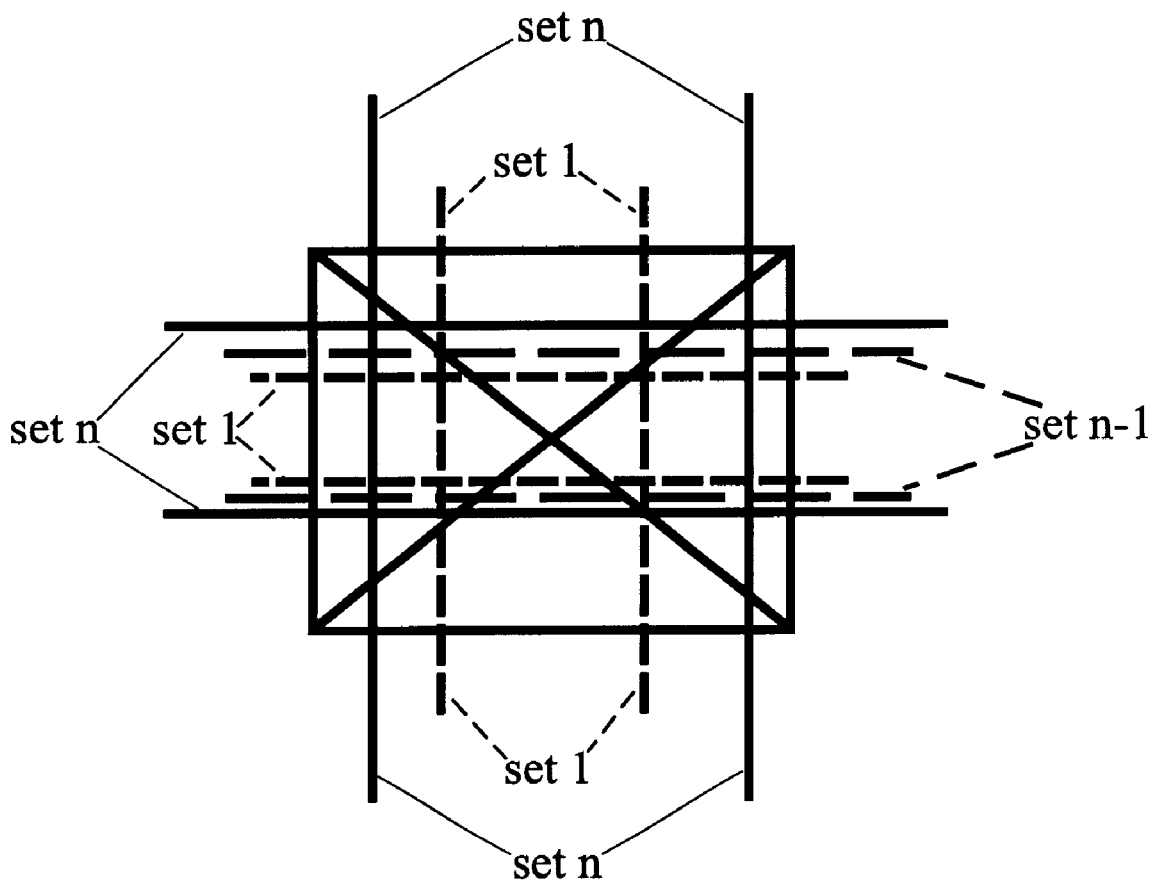
FIG. 4 illustrates a further embodiment which also adds additional sets (1 to n) of optical channel paths, wherein each additional set of four optical channel paths is positioned in the same plane perpendicular to the central axis of the X-cube, but is spaced at a different distance from the central axis of the X-cube.

FIG. 4 illustrates a further embodiment which also adds additional sets (1 to n) of optical channel paths beyond the one set of four primary optical channel paths illustrated in FIG. 1. In this embodiment each set of four optical channel paths is positioned in the same plane perpendicular to the longitudinal axis of the X-cube, but spaced at different distances from the longitudinal axis of the X-cube. The optical channel paths designated as set 1 are positioned a fixed distance from the longitudinal axis along the intersecting internal planes while the optical channel paths designated as set n are positioned a larger fixed distance from the longitudinal axis along the intersecting internal planes. The concept of FIG. 4 can be extended to any number n of optical channel paths, each positioned as a different fixed and spaced position from the longitudinal axis along the intersecting internal planes.

Moreover, the X-shaped intersecting internal planes can be divided into more than four different intensity transmission coefficients, for instance eight different intensity transmission coefficients for the embodiment of FIG. 4, or a greater number for a larger number n.

In the embodiment of FIG. 4 different sets of optical inputs/outputs are shared laterally within the same cross-section plane of the X-cube.

TABLE 2

Summary Tolerance due to Angular Alignment Errors

| Prism | | Input | | Output Alignment Error | | | |
|---|---|---|---|---|---|---|---|
| $\theta_{ip}$ | $\theta_{op}$ | $\alpha_{ip}$ | $\alpha_{op}$ | $\Delta_{ip}$ | $\Delta_{op}$ | $\Delta\beta_{ip}$ | $\Delta\beta_{ip}$ |
| 0 | 0 | 0 | 0 | 0 | 0 | 0 | 0 |
| 0 | 0 | 0 | $\alpha_{op}$ | 0 | $d\alpha_{op}$ | 0 | $\alpha_{op}$ |
| 0 | 0 | $\alpha_{ip}$ | 0 | $d\alpha_{ip}$ | 0 | 0 | 0 |
| 0 | 0 | $\alpha_{ip}$ | $\alpha_{op}$ | $d\alpha_{ip}$ | $d\alpha_{op}$ | 0 | $\alpha_{op}$ |
| 0 | $\theta_{op}$ | 0 | 0 | 0 | $d\theta_{op}$ | 0 | $\theta_{op}$ |
| 0 | $\theta_{op}$ | 0 | $\alpha_{op}$ | 0 | $d(\theta_{op} + \alpha_{op})$ | 0 | $\theta_{op} + \alpha_{op}$ |
| 0 | $\theta_{op}$ | $\alpha_{ip}$ | 0 | $d\alpha_{ip}$ | $d\theta_{op}$ | 0 | $\theta_{op}$ |
| 0 | $\theta_{op}$ | $\alpha_{ip}$ | $\alpha_{op}$ | $d\alpha_{ip}$ | $d(\theta_{op} + \alpha_{op})$ | 0 | $\theta_{op} + \alpha_{op}$ |
| $\theta_{ip}$ | 0 | 0 | 0 | $d\theta_{ip}$ | 0 | $\theta_{ip}$ | 0 |
| $\theta_{ip}$ | 0 | 0 | $\alpha_{op}$ | $d\theta_{ip}$ | $d\alpha_{op}$ | $\theta_{ip}$ | $\alpha_{op}$ |
| $\theta_{ip}$ | 0 | $\alpha_{ip}$ | 0 | $d(\theta_{ip} + \alpha_{ip})$ | 0 | $\theta_{ip} + \alpha_{ip}$ | 0 |
| $\theta_{ip}$ | 0 | $\alpha_{ip}$ | $\alpha_{op}$ | $d(\theta_{ip} + \alpha_{ip})$ | $d\alpha_{op}$ | $\theta_{ip} + \alpha_{ip}$ | $\alpha_{op}$ |
| $\theta_{ip}$ | $\theta_{op}$ | 0 | 0 | $d\theta_{ip}$ | $d\theta_{op}$ | $\theta_{ip}$ | $\theta_{op}$ |
| $\theta_{ip}$ | $\theta_{op}$ | 0 | $\alpha_{op}$ | $d\theta_{ip}$ | $d(\theta_{op} + \alpha_{op})$ | $\theta_{ip}$ | $\theta_{op} + \alpha_{op}$ |
| $\theta_{ip}$ | $\theta_{op}$ | $\alpha_{ip}$ | 0 | $d(\theta_{ip} + \alpha_{ip})$ | $d\theta_{op}$ | $\theta_{ip} + \alpha_{ip}$ | $\theta_{op}$ |
| $\theta_{ip}$ | $\theta_{op}$ | $\alpha_{ip}$ | $\alpha_{op}$ | $d(\theta_{ip} + \alpha_{ip})$ | $d(\theta_{op} + \alpha_{op})$ | $\theta_{ip} + \alpha_{ip}$ | $\theta_{op} + \alpha_{op}$ |

FIG. 3 illustrates an additional embodiment which adds additional sets (1 to n) of optical channel paths beyond the one set of four primary optical channel paths illustrated in FIG. 1. In this embodiment each set of four optical channel paths is positioned at a different fixed and spaced position along the central longitudinal axis (the axis along which the apexes of the four roof-top prisms meet) of the X-cube.

Moreover, the concepts of the embodiments of FIGS. 3 and 4 could be combined to have n sets, each of which is spaced at different positions along the longitudinal axis (FIG. 3), and each of which is further multiplied into n further sets, each of which is spaced a different distance along the intersecting internal planes from the longitudinal axis. Moreover, the number of different intensity transmission coefficients could be increased in accordance therewith.

While several embodiments and variations of the present invention for an X-cube integrated solid optical component are described in detail herein, it should be apparent that the disclosure and teachings of the present invention will suggest many alternative designs to those skilled in the art.

What is claimed is:

1. An integrated solid optical module for optical beam splitting and/or optical filtering, comprising an assembly of four right-angle roof-top prisms positioned with the apex of each roof-top prism at the center of the assembly, such that the assembly defines two mutually orthogonal and intersecting internal planes which intersect at the center of assembly, to form four sections of the intersecting internal planes which form up to four or more primary optical channel paths having up to four or more potential inputs $I_{AI}$, $I_{BI}$, $I_{CI}$ and $I_{DI}$, and four or more potential outputs $I_{AO}$, $I_{BO}$, $I_{CO}$ and $I_{DO}$ and wherein the outputs depend upon functionalities provided by the four sections of the intersecting internal planes, and wherein denoting intensity transmission coefficients of the four sections of the intersecting internal planes as $t_a$, $t_b$, $t_c$, and $t_d$ and assuming ideal lossless conditions at the intersecting internal planes, the integrated solid optical module defines the following set of input-output relations, $$I_{AO}=I_{AI}(1-t_a)(1-t_d)+I_{BI}t_a(1-t_d)+I_{CI}t_c t_d+I_{DI}(1-t_c)t_d$$

$$I_{BO}=I_{AI}t_a(1-t_b)+I_{BI}(1-t_a)(1-t_b)+I_{CI}(1-t_c)t_b+I_{DI}t_c t_b$$

$$I_{CO}=I_{AI}t_a t_b+I_{BI}(1-t_a)t_b+I_{CI}(1-t_c)(1-t_b)+I_{DI}t_c(1-t_b)$$

$$I_{DO}=I_{AI}(1-t_a)t_d+I_{BI}t_a t_d+I_{CI}t_c(1-t_d)+I_{DI}(1-t_c)(1-t_d),$$

and depending upon the transmission coefficients, the optical module and four outputs are used for different applications.

2. An integrated solid optical module in claim 1, comprising a 4×4 beam splitter or star-coupler wherein all four transmission coefficients are substantially 0.5 and each of the four outputs receives a quarter of its optical power from each of the four inputs.

3. An integrated solid optical module as claimed in claim 2, comprising a wavelength-division multiplexer (WDM) star-coupler wherein a broadband filter coating is applied to each of the four sections, to pass four wavelengths of light in the four optical channels.

4. An integrated solid optical module as claimed in claim 1, comprising a 16×16 channel wavelength-division multiplexer (WDM) passive wavelength router each of the four inputs contains four identical wavelength channels and wherein the WDM passive wavelength router permutes among wavelength-and-space coded channels, and wherein $$t_a(\lambda_1,\lambda_2)=1,\ t_a(\lambda_3,\lambda_4)=0$$

$$t_b(\lambda_2,\lambda_3)=1,\ t_b(\lambda_1,\lambda_4)=0$$

$$t_c(\lambda_3,\lambda_4)=1,\ t_c(\lambda_1,\lambda_2)=0$$

$$t_d(\lambda_1,\lambda_4)=1,\ t_d(\lambda_2,\lambda_3)=0,$$

such that each of the four sections transmits two wavelength bands and reflects two other wavelength bands, and each of the four channels outputs are shuffled as follows $$I_{AO}=I_{AI}(\lambda_3)+I_{BI}(\lambda_2)+I_{CI}(\lambda_4)+I_{DI}(\lambda_1)$$

$$I_{BO}=I_{AI}(\lambda_1)+I_{BI}(\lambda_4)+I_{CI}(\lambda_2)+I_{DI}(\lambda_3)$$

$$I_{CO}=I_{AI}(\lambda_2)+I_{BI}(\lambda_3)+I_{CI}(\lambda_1)+I_{DI}(\lambda_4)$$

$$I_{DO}=I_{AI}(\lambda_4)+I_{BI}(\lambda_1)+I_{CI}(\lambda_3)+I_{DI}(\lambda_2).$$

5. An integrated solid optical module as claimed in claim 1, comprising a two channel add/drop wavelength-division multiplexer (WDM) which downloads data transmitted by any two wavelength carriers out of n possible WDM channels and uploads new data to the two wavelength carriers, such that only six out of the eight channels of the integrated solid optical module are used, two for the main input and the output channels, and two each for the added/dropped wavelength channels for each carrier, and the corresponding filter assignments are $$t_{ai}=t_{bj}=t_{ci}=t_{dj}=1.0$$

all other $t_{a,b,c,d}=0$ such that, $$I_{AI}=I(\lambda_1 \ldots \lambda_{i\ drop}, \ldots \lambda_j drop, \ldots, \lambda_n)$$

$$I_{BI}=I(\lambda_{i\ add}),\ I_{CI}=0,\ I_{DI}=I(\lambda_{j\ add})$$

$$I_{AO}=I(\lambda_1 \ldots \lambda_{i\ add}, \ldots \lambda_{j\ add}, \ldots \lambda_n)$$

$$I_{BO}=I(\lambda_{i\ drop}),\ I_{CO}=0,\ I_{DO}=I(\lambda_{j\ drop}).$$

6. An integrated solid optical module as claimed in claim 1, further including polarization-coded beam-splitting and/or filtering.

7. An integrated solid optical module as claimed in claim 1, wherein the four filter plane sections incorporate active switching functionalities.

8. An integrated solid optical module as claimed in claim 1, further comprising a fiber-optics interface, which includes eight interfacing multimode fiber collimators configured as four collimating-focusing fiber pairs.

9. An integrated solid optical module as claimed in claim 1, including at least one additional set (1 to n) of optical channel paths in addition to the set of four primary optical channel paths, wherein each additional set of four optical channel paths is positioned at a different fixed and spaced position along the central axis at which the apexes of the four roof-top prisms meet.

10. An integrated solid optical module as claimed in claim 9, including at least one additional set (1 to n) of optical channel paths in addition to the set of four primary optical channel paths, wherein each additional set of four optical channel paths is positioned in the same plane perpendicular to the central axis of the optical module as the four primary optical channel paths, but spaced at a different distance from the central axis of the optical module.

11. An integrated solid optical module as claimed in claim 1, including at least one additional set (1 to n) of optical channel paths in addition to the sets of four primary optical channel paths, wherein each additional set of four optical channel paths is positioned in the same plane perpendicular to the central axis of the optical module as the four primary optical channel paths, but spaced at a different distance from the central axis of the optical module.

* * * * *